US011978616B2

(12) United States Patent
Jurek et al.

(10) Patent No.: US 11,978,616 B2
(45) Date of Patent: May 7, 2024

(54) DETECTOR HAVING IMPROVED CONSTRUCTION

(71) Applicant: ADAPTAS SOLUTIONS PTY LTD, Clyde (AU)

(72) Inventors: Russell Jurek, Clyde (AU); David Dellagiacoma, Clyde (AU); Kevin Hunter, Clyde (AU)

(73) Assignee: ADAPTAS SOLUTIONS PTY LTD, Clyde (AU)

( * ) Notice: Subject to any disclaimer, the term of this patent is extended or adjusted under 35 U.S.C. 154(b) by 731 days.

(21) Appl. No.: 17/053,192

(22) PCT Filed: May 6, 2019

(86) PCT No.: PCT/AU2019/050414
§ 371 (c)(1),
(2) Date: Nov. 5, 2020

(87) PCT Pub. No.: WO2019/213697
PCT Pub. Date: Nov. 14, 2019

(65) Prior Publication Data

US 2021/0142992 A1 May 13, 2021

(30) Foreign Application Priority Data

May 7, 2018 (AU) ................................ 2018901542

(51) Int. Cl.
*H01J 49/02* (2006.01)
*H01J 43/28* (2006.01)
*H01J 49/26* (2006.01)

(52) U.S. Cl.
CPC ............ *H01J 43/28* (2013.01); *H01J 49/025* (2013.01); *H01J 49/26* (2013.01)

(58) Field of Classification Search
CPC ................................ H01J 43/28; H01J 49/025
See application file for complete search history.

(56) References Cited

U.S. PATENT DOCUMENTS 5,446,275 A * 8/1995 Sakai ..................... H01J 43/28
250/397
2003/0034449 A1 2/2003 Miller et al.
(Continued)

OTHER PUBLICATIONS

International Search Report dated Jul. 25, 2019 for corresponding International Patent Application PCT/AU2019/050414 filed on May 6, 2019.

(Continued)

*Primary Examiner* — Eliza W Osenbaugh-Stewart
(74) *Attorney, Agent, or Firm* — David D. Brush; Westman, Champlin & Koehler, P.A.

(57) ABSTRACT

Components of scientific analytical equipment, such as electron multipliers and modifications thereto, for extending the operational lifetime or otherwise improving performance by way of improved construction. A detector includes one or more electron emissive surfaces and one or more detector elements configured to define on one side an environment internal the detector and on the other side an environment external the detector. The one or more detector elements are configured to inhibit or prevent flow of a gas from the environment external the detector to the environment internal the detector. Such detectors may be used in a mass spectrometry instrument, for example.

14 Claims, 6 Drawing Sheets

(56) References Cited

U.S. PATENT DOCUMENTS

| | | | | |
|---|---|---|---|---|
| 2003/0137244 | A1 * | 7/2003 | Shimoi .................. | H01J 43/22<br>313/533 |
| 2014/0264013 | A1 | 9/2014 | Rafferty et al. | |

OTHER PUBLICATIONS

Written Opinion Report dated Jul. 25, 2019 for corresponding International Patent Application PCT/AU2019/050414 filed on May 6, 2019.

* cited by examiner

DETECTOR HAVING IMPROVED CONSTRUCTION

The present application is a Section 371 National Stage Application of International Application No. PCT/AU2019/050414, filed May 6, 2019 and published as WO 2019/213697 Al on Nov. 14, 2019, in English, which claims priority from Australian provisional patent application 2018901542, filed May 7, 2018, the contents of which are hereby incorporated by reference in their entireties.

FIELD OF THE INVENTION

The present invention relates generally to components of scientific analytical equipment. More particularly, but not exclusively, the invention relates to electron multipliers and modifications thereto for extending the operational lifetime or otherwise improving performance by way of improved construction.

BACKGROUND TO THE INVENTION

In a mass spectrometer, the analyte is ionized to form a range of charged particles (ions). The resultant ions are then separated according to their mass-to-charge ratio, typically by acceleration and exposure to an electric or magnetic field. The separated signal ions impact on an ion detector surface to generate one or more secondary electrons. Results are displayed as a spectrum of the relative abundance of detected ions as a function of the mass-to-charge ratio.

In other applications the particle to be detected may not be an ion, and may be a neutral atom, a neutral molecule, or an electron. In any event, a detector surface is still provided upon which the particles impact.

The secondary electrons resulting from the impact of an input particle on the impact surface of a detector are typically amplified by an electron multiplier. Electron multipliers generally operate by way of secondary electron emission whereby the impact of a single or multiple particles on the multiplier impact surface causes single or (preferably) multiple electrons associated with atoms of the impact surface to be released.

One type of electron multiplier is known as a discrete-dynode electron multiplier. Such multipliers include a series of surfaces called dynodes, with each dynode in the series set to increasingly more positive voltage. Each dynode is capable of emitting one or more electrons upon impact from secondary electrons emitted from previous dynodes, thereby amplifying the input signal.

Another type of electron multiplier operates using a single continuous dynode. In these versions, the resistive material of the continuous dynode itself is used as a voltage divider to distribute voltage along the length of the emissive surface.

A simple example of a continuous dynode multiplier is a channel electron multiplier (CEM). This type of multiplier consists of a single tube of resistive material having a treated surface. The tube is normally curved along its long axis to mitigate ion feedback. The term “bullet detector” is sometimes used in the art.

A CEM may have multiple tubes in combination to form an arrangement often referred to as a multi-channel CEM. The tubes are often twisted about each other, rather than simply curved as in the case of the single tube version discussed immediately above.

A further type of electron multiplier is the magneTOF detector, being both a cross-field detector and a continuous dynode detector.

An additional type of electron multiplier is a cross-field detector. A combination of electric fields and magnetic fields perpendicular to the motions of ions and electrons are used to control the motions of charged particles. This type of detector is typically implemented as a discrete or continuous dynode detector.

A detector may comprise a microchannel plate detector, being a planar component used for detection of single particles (electrons, ions and neutrons). It is closely related to an electron multiplier, as both intensify single particles by the multiplication of electrons via secondary emission. However, because a microchannel plate detector has many separate channels, it can additionally provide spatial resolution.

It is a problem in the art that the performance of electron emission-based detectors degrade over time. It is thought that secondary electron emission reduces over time causing the gain of the electron multiplier to decrease. To compensate for this process, the operating voltage applied to the multiplier must be periodically increased to maintain the required multiplier gain. Ultimately, however, the multiplier will require replacement. It is noted that detector gain may be negatively affected both acutely and chronically.

Prior artisans have addressed the problems of dynode ageing by increasing dynode surface area. The increase in surface area acts to distribute the work-load of the electron multiplication process over a larger area, effectively slowing the aging process and improving operating life and gain stability. This approach provides only modest increases in service life, and of course is limited by the size constraints of the detector unit with a mass spectrometry instrument.

A further problem in the art is that of internal ion feedback, this being particularly the case for microchannel plate detectors. As the number of electrons exponentially increases through the amplification means of the detector, adsorbed atoms can be ionized. These ions are then accelerated by the detector bias towards the detector input. Unless specific measures are taken these ions can have sufficient energy to release electrons as they collide with the channel wall. The collision initiates a second exponential increase in electrons. These “false” after-pulses not only interfere with an ion measurement, but may also lead to a permanent discharge and essentially destroy the detector over time.

It is an aspect of the present invention to overcome or ameliorate a problem of the prior art by providing a dynode-based detector having an extended service life, and/or improved performance. It is a further aspect to provide a useful alternative to the prior art.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY OF THE INVENTION

In a first aspect, but not necessarily the broadest aspect, the present invention provides a detector comprising one or more electron emissive surfaces, the detector comprising one or more detector elements configured to define on one side an environment internal the detector and on the other side an environment external the detector, wherein the one or more detector elements are configured to inhibit or prevent flow of a gas from the environment external the detector to the environment internal the detector.

In one embodiment of the first aspect, the flow is non-conventional flow.

In one embodiment of the first aspect, the detector comprises one or more electron emissive surfaces, the detector comprising: (i) first and second detector elements associated so as to form an interface, or (ii) a unitary detector element having a discontinuity, wherein the associated first and second detector elements or the unitary detector element having a discontinuity, define on one side an environment internal the detector and on the other side an environment external the detector, and wherein the interface or discontinuity is configured to inhibit or prevent the non-conventional flow of a gas from the environment external the detector to the environment internal the detector.

In one embodiment of the first aspect, the non-conventional flow is a molecular flow, or a transitional conventional/molecular flow.

In one embodiment of the first aspect, a sealant is disposed within or about the interface or discontinuity so as to inhibit or prevent the non-conventional flow of a gas from the environment external the detector to the environment internal the detector.

In one embodiment of the first aspect, the sealant is capable of forming a substantially gas-tight seal with a detector element.

In one embodiment of the first aspect, the sealant is also an adhesive.

In one embodiment of the first aspect, the first and/or second detector elements are configured such that a non-linear or tortuous path between the environment external the detector to the environment internal the detector is provided at the interface of the first and second detector elements.

In one embodiment of the first aspect, the first and second detector elements are positioned or angled relative to each other such that a non-linear or tortuous path between the environment external the detector and the environment internal the detector is provided at the interface between the first and second detector elements.

In one embodiment of the first aspect, the first and/or second detector elements is/are shaped such that a non-linear or tortuous path between the environment external the detector and the environment internal the detector is provided at the interface between the first and/or second detector elements.

In one embodiment of the first aspect, the non-linear or tortuous path is at a macroscopic level.

In one embodiment of the first aspect, the non-linear or tortuous path comprises two linear sub-paths, wherein an angle is formed at the intersection of the two linear sub-paths.

In one embodiment of the first aspect, the angle formed is greater than about 5, 10, 15, 20, 25, 30, 35, 40, 45, 50, 55, 60, 65, 70, 75, 80, or 85 degrees.

In one embodiment of the first aspect, the angle formed is greater than about 45 degrees.

In one embodiment of the first aspect, the angle formed is about 90 degrees.

In one embodiment of the first aspect, the non-linear or tortuous path comprises greater than 2, 3, 4, 5, 6, 7, 8, 9, 10, 11 or 12 linear sub-paths, and wherein an angle is formed at the intersection of each of the two linear sub-paths.

In one embodiment of the first aspect, one, most or each of the angles formed is greater than about 5, 10, 15, 20, 25, 30, 35, 40, 45, 50, 55, 60, 65, 70, 75, 80, or 85 degrees.

In one embodiment of the first aspect, the one, most or each of the angles formed is greater than about 45 degrees.

In one embodiment of the first aspect, the one, most or each of the angles formed is about 90 degrees.

In one embodiment of the first aspect, the non-linear or tortuous path is curved, or comprises a curve, or comprises a series of curves.

In one embodiment of the first aspect, the first detector element comprises a first formation or recess, and the second detector element comprises a second formation or recess, and wherein the first formation or recess snugly fits the second formation or recess so as to provide the interface between first and second detector elements.

In one embodiment of the first aspect, the first detector element comprises multiple formations and/or recesses, and the second detector element comprises multiple formations and/or recesses, and wherein the formations and/or recesses of the first detector element snugly fit the second formations and/or recesses of the second detector element so as to provide the interface or a part of the interface between first and second detector elements.

In one embodiment of the first aspect, one or more of the detector elements is a detector housing element, or a detector enclosure element, or a detector support element.

In one embodiment of the first aspect, the detector comprises at least about 2, 3, 4, 5, 6, 7, 8, 9, 10, 15, 20, 25, 30, 35, 40, 45 or 50 interfaces between detector elements, the interfaces between the detector elements being configured to inhibit or prevent the non-conventional flow of a gas from the environment external the detector to the environment internal the detector.

In one embodiment of the first aspect, the detector comprises: first and second detector elements defining a space therebetween, and a deformable member or a mass occupying the space, wherein the first and second detector elements and the deformable member or mass are configured to define on one side an environment internal the detector and on the other side an environment external the detector.

In one embodiment of the first aspect, the deformable member or mass is configured to inhibit or prevent entry of a gas external the detector into the detector.

In one embodiment of the first aspect, one or more of the detector elements is an element configured to limit or prevent entry of a gas external the detector into the detector.

In one embodiment of the first aspect, the gas is a residual gas usable as a sample carrier gas in a mass spectrometer.

In one embodiment of the first aspect, the detector comprises at least about 2, 3, 4, 5, 6, 7, 8, 9, 10, 15, 20, 25, 30, 35, 40, 45 or 50 interfaces between detector elements, the interfaces between the detector elements being configured to inhibit or prevent the transitional and/or molecular flow of a gas from the environment external the detector to the environment internal the detector.

In one embodiment of the first aspect, the particle is configured as an original part or a replacement part of a mass spectrometer.

In one embodiment of the first aspect, when the detector is in operation within the vacuum chamber of a mass spectrometer the inhibition or prevention of the non-conventional flow of a gas from the environment external the detector to the environment internal the detector is sufficient so as to cause the environment about the electron emissive surface(s) or an anode/collector of the detector to be different to the environment immediately external to the detector with regard to: the presence, absence or partial pressure of a gas species in the respective environments; and/or the presence, absence or concentration of a contaminant species in the respective environments.

In one embodiment of the first aspect, the first and/or second detector elements; and/or the interface between the first and second detector elements is/are configured so as to decrease a vacuum conductance of the detector.

In one embodiment of the first aspect, the interface between the first and second detector elements are configured to decrease a vacuum conductance of the detector.

In one embodiment of the first aspect, the first and/or second elements is/are a gas flow barrier capable of decreasing the vacuum conductance of the detector.

In one embodiment of the first aspect, the detector comprises a series of electron emissive surfaces arranged to form an electron multiplier.

In a second aspect, the present invention provides a mass spectrometer comprising the detector of any embodiment of the first aspect.

DETAILED DESCRIPTION OF THE INVENTION INCLUDING PREFERRED EMBODIMENTS THEREOF

Figure 1:
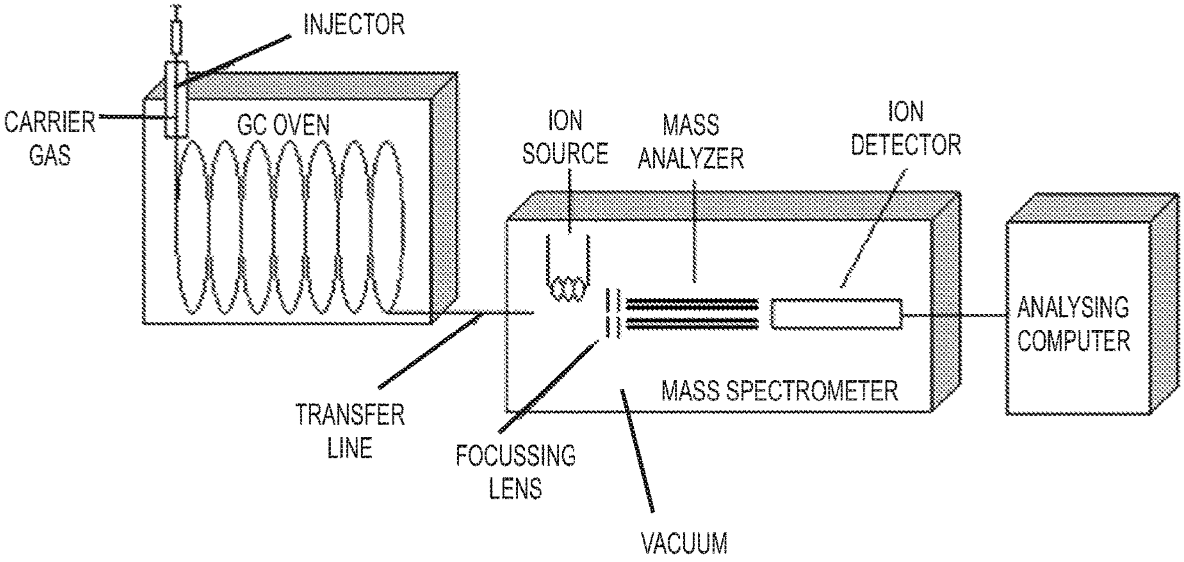
FIG. 1 is a highly schematic block diagram showing a typical arrangement whereby a gas chromatography instrument is coupled to a mass spectrometer, the mass spectrometer having an ion detector configured to minimise vacuum conductance of the type as described herein.

After considering this description it will be apparent to one skilled in the art how the invention is implemented in various alternative embodiments and alternative applications. However, although various embodiments of the present invention will be described herein, it is understood that these embodiments are presented by way of example only, and not limitation. As such, this description of various alternative embodiments should not be construed to limit the scope or breadth of the present invention. Furthermore, statements of advantages or other aspects apply to specific exemplary embodiments, and not necessarily to all embodiments covered by the claims.

Throughout the description and the claims of this specification the word “comprise” and variations of the word, such as “comprising” and “comprises” is not intended to exclude other additives, components, integers or steps.

Reference throughout this specification to “one embodiment” or “an embodiment” means that a particular feature, structure or characteristic described in connection with the embodiment is included in at least one embodiment of the present invention. Thus, appearances of the phrases “in one embodiment” or “in an embodiment” in various places throughout this specification are not necessarily all referring to the same embodiment, but may.

It will be appreciated that not all embodiments of the invention described herein have all of the advantages disclosed herein. Some embodiments may have a single advantage, while other may have no advantage at all and are merely a useful alternative to the prior art.

The present invention is predicated at least in part on the discovery that detector performance and/or service life is affected by the environment in which it is operated. In particular, altering the ability of gas and other materials (some of which may act as dynode contaminants) to enter the detector via any interface or discontinuity of the detector under the vacuum established thereabout has been found to affect service life and/or performance. The need to inhibit or prevent the entry of gas or other materials into and out of a detector by way of interfaces and discontinuities has not been previously considered by prior artisans when designing detectors for use in mass spectrometry and other applications.

Applicant proposes a range of features for incorporation into existing detector design, or alternatively as the bases for de novo detector design. These features have the common function of forming a barrier or partial barrier or other means for slowing the movement of an atom or a molecule or any larger species into the detector. In the absence of the present invention, such atoms, molecules or larger species would otherwise be capable of exploiting any discontinuity in a detector element, or any interface between two detector elements to enter a detector and potentially contaminate an electron emissive surface or an anode/collector of the detector or cause other malfunction.

Detectors of the present invention may function so as to decrease the vacuum conductance of gas or other material into and out of a detector., so as to The present detectors may have the further effect of uncoupling the environment internal the detector from the environment external the detector. The desirable end result is a lessening of any opportunity for a potential contaminant to enter the detector and foul an electron emissive surface (such as a dynode surface), or a collector/anode surface of the detector.

As understood by the skilled person, detectors are operated in various pressure regimes. At sufficiently low pressures, the gas inside and outside the detector no longer flows like a conventional fluid and instead operates in either transitional flow or molecular flow. Without wishing to be limited by theory in any way, Applicant proposes that when the internal and external detector environments are operating in transitional and/or molecular flow regimes (i.e. non-conventional flow), any interface between elements or a discontinuity in an element may provide a route via which a contaminant may enter the internal detector environment.

Given this discovery, there is proposed a solution in preventing or at least inhibiting the molecular or transitional flow of gas into the detector by various means. Such means include the use of a sealant composed of a material that is substantially gas impermeable and capable of forming a substantially gas-tight seal with detector elements. Other means include the implementation of various strategies for joining detector elements so as to provide a non-linear or tortuous path to limit or prevent the ability for gas into the detector.

As will be appreciated, any interface is in fact three dimensional, and accordingly many paths are available to a molecule traversing the interface even where a linear line of sight through the interface may be drawn. In the context of the invention, the term "non-linear or tortuous" is intended to include any arrangement whereby a linear line of sight cannot be drawn through the interface from one side to the other when a two dimensional cross-section is considered.

A means for preventing or at least inhibiting the molecular or transitional flow of gas into the detector may function as to absolutely prevent the passage of a gas molecule (or indeed any other contaminant) from external to internal the detector. In some forms of the invention, the means acts to delay or retard the passage of a gas molecule such that for a given unit of time, the number of molecules that enter the detector is less than that where no such means are provided. The unit of time may be considered by reference to the length of time required for a mass spectrometry analysis. Where a mass spectrometer is coupled to a separation apparatus (such as a gas chromatography apparatus), it may be desirable to inhibit or prevent entry of a sample carrier gas into the detector of the spectrometer for a period of at least about one hour, such period being required to pass the sample through the chromatography medium and to detect species sequentially exiting therefrom. Where a sample is directly injected into a mass spectrometer, the unit of time may be around 10 minutes, or even less.

To decrease the coupling of the external and internal detector environments the features described infra are contemplated to be useful. For example, where the detector is incorporated in a mass spectrometer the decoupling enables the detector itself to act as a pump. By sealing/shielding the detector, this internal pumping mechanism create a beneficial environment. Little or no internal pumping occurs without the sealing/shielding because it is a relatively weak pump. This internal pumping acts additively to the vacuum pump of a mass spectrometer to create a superior operating environment in which the electron emissive surfaces or an anode/collector surface may operate. The primary benefit of a better operating environment is increased detector operating life. Secondary benefits include reduced noise, reduced ion feedback, increased sensitivity and increased dynamic range.

In some embodiments, the means for preventing or at least inhibiting the molecular or transitional flow of gas into the detector is intended to be effective in respect of a carrier gas (such as hydrogen, helium or nitrogen) used to conduct sample to the ionization means of a mass spectrometer in which the detector is installed. Once the sample is ionized, the passage of the resulting ions is under control of the mass analyser, however residual carrier gas continues on beyond the mass analyser and toward the ion detector. In the prior art, no regard is had to the effect of the residual carrier gas on the service life and/or performance of the detector. Applicant has found that the residual carrier gas typically contains contaminants that foul or otherwise interfere with the operation of the dynodes (being the amplifying electron emissive surfaces) of the detector, or the collector/anode of the detector. In some circumstances, the carrier gas itself may have a deleterious effect on dynodes or a collector/anode.

A detector may comprise a unitary element having a discontinuity therein. The element may be dedicated to or incidentally responsible for maintaining separation between an internal detector environment (i.e. the environment about the electron emissive surfaces or a collector/anode surface) and an external detector environment (i.e. the environment within a vacuum chamber in which the detector is operable). The separation in environments provided by the unitary element does not necessarily provide complete separation and in many instances may only lessen the probability that a gas molecule will enter the environment internal the detector.

The discontinuity in the unitary detector element may be a discrete aperture for example, that allows for molecular or transitional flow of gas into the detector. Alternatively, the discontinuity may arise from a porousness of a material from which the detector element is fabricated which allows for molecular or transitional flow of gas through the material and into the detector. In any event, a sealant may be applied to the discontinuity so as to provide a barrier or partial barrier to passage of the gas or any other contaminant comingling therewith.

The sealant may have adhesive properties also to facilitate bonding to the surface of a discontinuity, and also surrounding material so as to prevent dislodgement in the course of a vacuum being formed and broken as is routine in the vacuum chamber of a mass spectrometer.

Suitable sealants/adhesives may include a solder, a polymer such as a polyimide (optionally in tape form, such as Kapton™ tape). Preferably the sealant/adhesive is one that, once cured, minimally contributes to "virtual leak" in that it does not substantially desorb a liquid, a vapour or a gas into the chamber under vacuum. Such materials are often termed in the art "vacuum safe". Desorbed substances can have detrimental effects on a vacuum pumping system of an instrument.

In some circumstances, the construction of a detector requires the association of two or more elements, to provide a composite structure. The composite structure may be dedicated to or incidentally responsible for maintaining separation between an internal detector environment (i.e. the environment about the electron emissive surfaces or a collector/anode surface) and an external detector environment (i.e. the environment within a vacuum chamber in which the detector is operable).

The composite structure may provide a means for preventing or at least inhibiting the molecular or transitional flow of gas into the detector, and in which case an interface between two detector elements provides a potential means by which a gas may enter into the detector by way of molecular or transitional flow.

Either or both detector elements contributing to the composite structure may be configured in a dedicated or incidental manner to achieve the aim of preventing or at least inhibiting the molecular or transitional flow of gas into the detector. These features may be incorporated into the detector alone, or in combination with any one or more of any other feature of disclosed herein.

In other embodiments, a third element may be added to the composite structure to further prevent or at least inhibit the molecular or transitional flow of gas into the detector. For example, where a first and second element abut to form an interface a third element may be applied over the first and second elements so as to straddle the interface. The third element may be secured in place by any means, but preferably by way of an adhesive, and more preferably an adhesive with sealant properties. Any one or more of these features may be incorporated into the detector alone, or in combination with any one or more of any other feature of disclosed herein.

Figure 2:
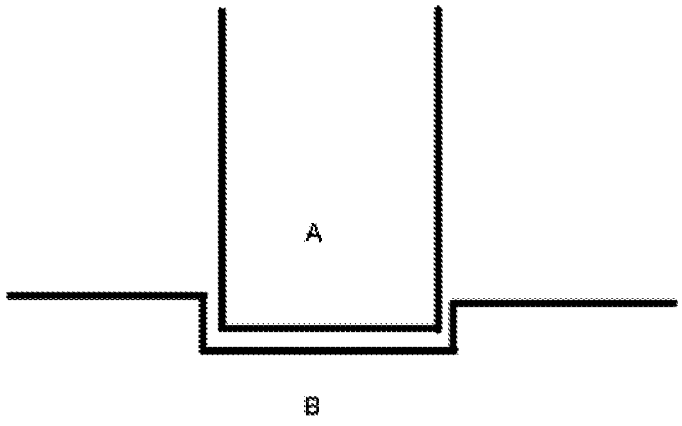
FIG. 2 is a cross-sectional diagram of an exemplary interface between two detector elements (“A” and “B”) so as to form a non-linear or tortuous path at the interface thereof.

Reference is made to FIG. 2, which shows a first detector element "A" and second detector element "B", detector element "B" having a recess that allows for element "A" to snugly fit therein. The elements "A" and "B" are shown separated so as to more clearly show the profile of each and also the "U"-shaped interface between the two elements. In reality, the elements "A" and "B" would be mutual contact so as to form an interface providing a barrier or partial barrier to a gas.

Even though the elements "A" and "B" contact each other, a gas may nevertheless pass via the interface by molecular or transitional flow so as to move from an environment external the detector to an environment internal the detector. However, the non-linear or tortuous path provided by the two 90 degree corners of the interface inhibits the transitional or molecular flow of gas therethrough. Any one or more of these features may be incorporated into the detector alone, or in combination with any one or more of any other feature of disclosed herein.

The arrangement of FIG. 2 is in contrast to a situation where element "B" has no recess, and element "A" merely sits on the planar surface of element "B". In that situation, the interface is strictly linear, and accordingly a gas is more likely to migrate by molecular or transitional flow from external to internal the detector as compared with the arrangement of FIG. 2 where the interface defines a non-linear or tortuous path. Any one or more of these features may be incorporated into the detector alone, or in combination with any one or more of any other feature of disclosed herein.

Figure 3:
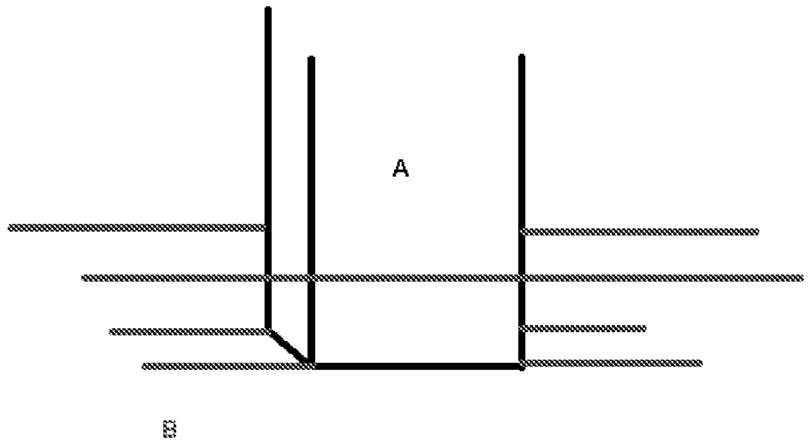
FIG. 3 is a perspective diagram of an exemplary interface between two detector elements (“A” and “B”) so as to form a non-linear or tortuous path at the interface thereof.

FIG. 3 shows a similar arrangement to that in FIG. 2 except that a relatively deep longitudinal slot is provided in element "B" into which element "A" is snugly engaged. The interface formed between elements "A" and "B" of FIG. 2 is longer than that formed than that shown in FIG. 2 given the increased depth of the slot in element "B". The further length minimises the ability for a gas molecule to migrate the length of the interface in a unit time. These features may be incorporated into the detector alone, or in combination with any one or more of any other feature of disclosed herein.

Figure 4:
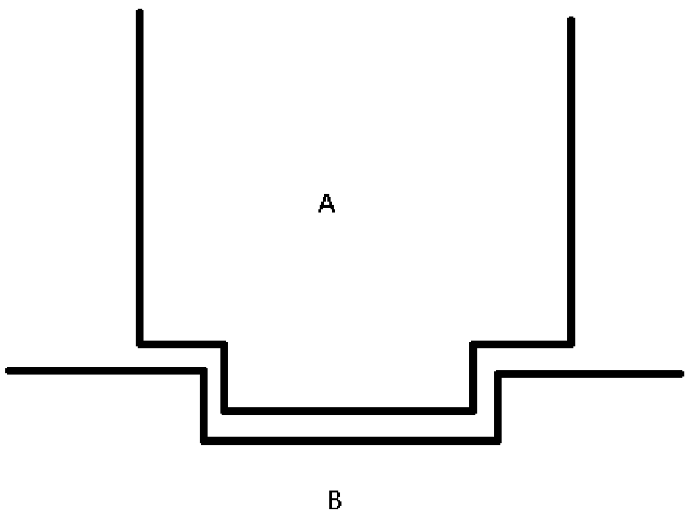
FIG. 4 is a cross-sectional diagram of an exemplary interface between two detector elements (“A” and “B”) so as to form a non-linear or tortuous path at the interface thereof, one of the elements having a formation and the other having a complimentary recess.

FIG. 4 shows an interface formed by element "A" and element "B", similar to the embodiment of FIG. 1 with element "A" having a downwardly extending formation configured so as to snugly engage with the recess formed in element "B". This arrangement provides an improved barrier or partial barrier to the migration of gas by molecular or transitional flow over the embodiment of FIG. 1. The improvement results from the elongation of the path defined by interface, and also the non-linear or tortuous path having four 90 degree corners. These features may be incorporated into the detector alone, or in combination with any one or more of any other feature of disclosed herein.

Figure 5:
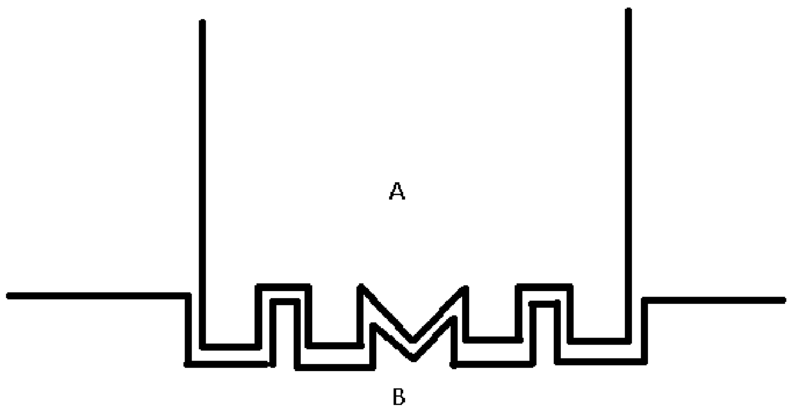
FIG. 5 is a cross-sectional diagram of an exemplary interface between two detector elements (“A” and “B”) so as to form a non-linear or tortuous path at the interface thereof, one of the elements having a series of formations and the other having a series of complimentary recesses.

FIG. 5 shows an interface formed by element "A" and element "B", similar to the embodiment of FIG. 4 however with element "A" having a series of downwardly extending formations configured so as to snugly engage with a complimentary recess of element "B". This arrangement provides an improved barrier or partial barrier to the migration of gas by molecular or transitional flow over the embodiment of FIG. 4. The improvement results from the elongation of the path defined by interface (each of the formations extended the path length), and also the non-linear or tortuous path having ten 90 degree corners and three 45 degree corners. These features may be incorporated into the detector alone, or in combination with any one or more of any other feature of disclosed herein.

Figure 6:
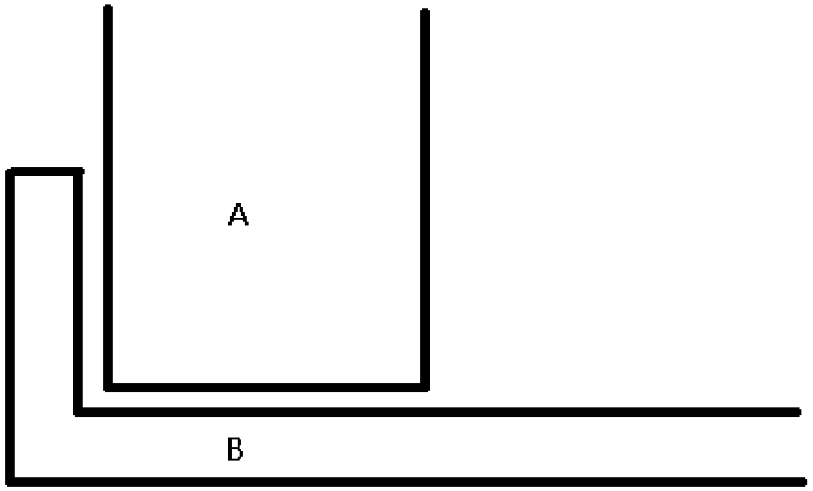
FIG. 6 is a cross-sectional diagram of an exemplary interface between two detector elements (“A” and “B”) so as to form a non-linear or tortuous path at the interface thereof, one of the elements having a peripheral lip.

FIG. 6 shows an embodiment whereby element "B" comprises a lip against which element "A" abuts on its lateral face. The downwardly directed end face of element "A" contacts the upwardly facing surface of element "B". In this arrangement, the interface provides a non-linear or tortuous path having a single 90 degree corner. As will be appreciated, the depth of lip adds to the path length with a deeper lip providing increased inhibition or prevention of molecular or transitional flow of gas along the interface. These features may be incorporated into the detector alone, or in combination with any one or more of any other feature of disclosed herein.

Figure 7:
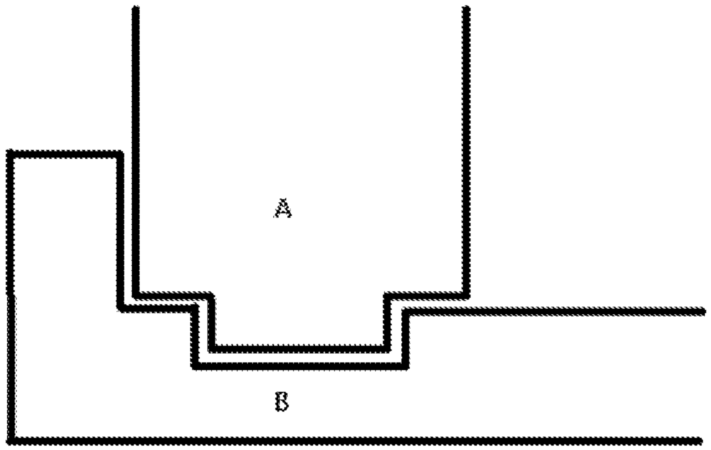
FIG. 7 is a cross-sectional diagram of an exemplary interface between two detector elements (“A” and “B”) so as to form a non-linear or tortuous path at the interface thereof, one of the elements having a peripheral lip and a recess and the other having a complementary formation.

FIG. 7 shows a more complicated arrangement including the use of a formation on element "A", with a complementary recess and a lip on element "B". It will be appreciated that the thickness of element "A" (in the y-direction) provides an increased path length to more effectively inhibit passage of gas through the interface.

It will be appreciated that a non-linear or tortuous path may be comprised at least in part of curved segment, or multiple curved segments. For example, in reference to FIG. 1, the downwardly facing surface of element "A" may be curved or rippled, with the recess of element "B" being complimentary such that the two elements fit together snugly. Generally, the use of shallow curves may be less effective than 90 degree corners in preventing or inhibiting the migration of gas through the interface based on molecular or transitional flow.

In some embodiments a non-linear or tortuous path is provided by a combination of curved and linear segments.

In any of the embodiments above, and any further embodiments conceived by the skilled person a sealant (that may also function as an adhesive) may be applied to mutually contacting region(s) of element "A" and/or element "B" before assembly in order to further limit any gas flow through the interface. In addition or alternatively, the sealant/adhesive may be disposed outside of the interface so as to cover any region where element "A" and element "B" abut (for example, along a line formed by a laterally facing surface of element "A" and an upwardly facing surface of element "B"). These features may be incorporated into the detector alone, or in combination with any one or more of any other feature of disclosed herein.

A sealant may be used within or about the interface of two elements, where the two elements provide a linear or non-tortuous path from the environment external the detector to an environment internal the detector. Even though a linear or non-tortuous path is provided, the presence of a seal may be sufficient in some circumstances to adequately inhibit or prevent the entry of gas molecules into the detector.

In some embodiments of detector, two detector elements do not form an interface and instead a space is defined therebetween. The space may allow for non-conventional fluid flow (such as. transitional and/or molecular flow) of a gas external to internal the detector. To inhibit or prevent the flow of gas through the space, a deformable member or a deformable mass may be disposed in the space. The member or mass is configured to occupy the space by deforming (for example by, flexing, stretching, compressing, expanding, or oozing). The deformation (and therefore occlusion or partial occlusion) may be caused by the movement of one element relative to the other. Otherwise, the two elements remain in fixed spatial relationship but the deformable member or mass is caused or allowed to occupy the space therebetween.

As will be appreciated, the deformable member or mass may be composed of a material or a compound that inhibits the passage of a gas therethrough so as to maintain a difference between the environment internal the detector and the environment external the detector. The material or composition may have a low propensity to release an atom or a molecule into the significant vacuum formed within the vacuum chamber of a mass spectrometer.

Figure 8A:
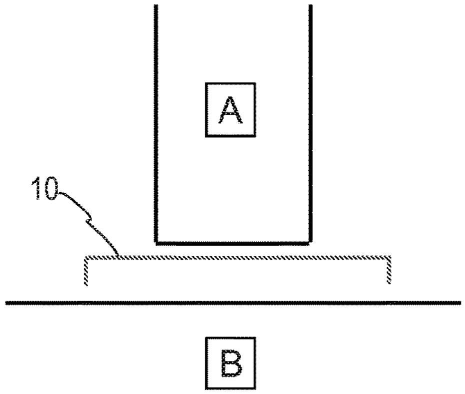
FIG. 8A and FIG. 8B are cross-sectional diagrams of two detector elements (“A” and “B”) with a deformable member used to occlude or partially occlude the space therebetween.
Figure 8B:
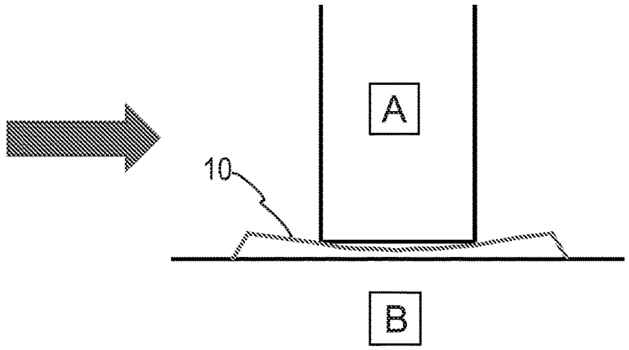

FIG. 8A shows two detector elements ("A" and "B") having a space therebetween within which a deformable member (10) is disposed. FIG. 8B shows the arrangement of FIG. 8A after downward movement of the element "A" such that the deformable member (10) occludes or partially occludes the space between element "A" and element "B". The deformable member in this embodiment is a stiff and substantially U-shaped member. The pre-formed shape of the member is disrupted by the movement of element "A" relative to element "B". The stiffness of the member causes the member to attempt to return to its original U-shaped thereby creating a force bearing against the elements. Put another way, the member may be biased to assume a shape when deformed, the shape configured to occlude or partially occlude the space. Members having other shapes are of course contemplated including triangular shapes, curves and irregular shapes.

Figure 9A:
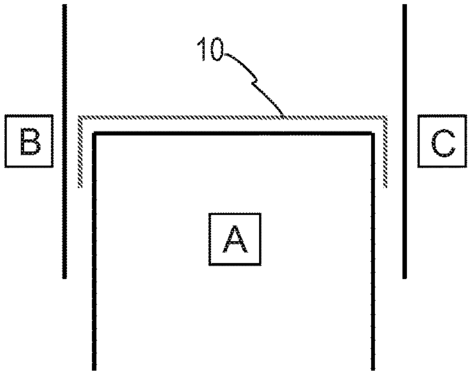
FIG. 9A and FIG. 9B are cross-sectional diagrams of three detector elements (“A”, “B” and “C”) with a deformable member used to occlude or partially occlude the space between the elements.
Figure 9B:
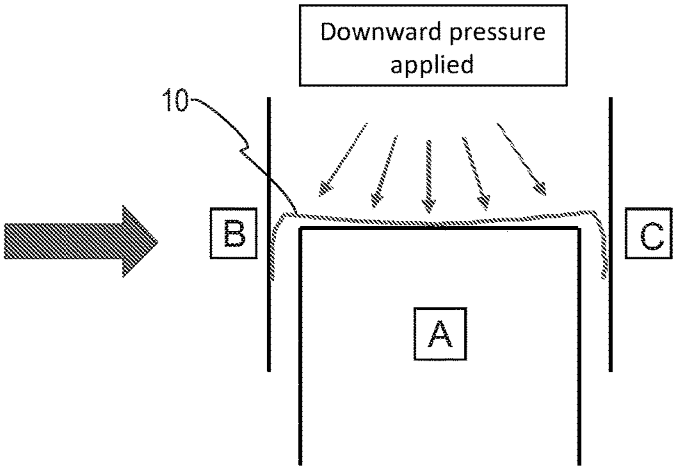

FIG. 9A shows three detector elements ("A", "B" and "C") having a first space between element "A" and element "B" and a second space between element "A" and element "C", and a deformable member (10) is disposed within the first and second spaces. FIG. 9B shows the arrangement of FIG. 9A after a downward pressure is applied in the direction indicated by the arrows such that the deformable member (10) occludes or partially occludes the first and second spaces. In this embodiment a stiff, U-shaped member is placed across a central element ("A"), such that the wings of the member flare out under pressure to seal the gaps between the central element and two joining elements. The stiffness of the member transmits force applied to one area of the member, through tension, to other areas of the member such that they flare in and/or out. These flared regions can then be positioned within the space where two elements meet. With careful arrangement these flared regions within the spaces will form a pressure contact with one or both of the elements that form the join gap.

Figures 10A, 10B:
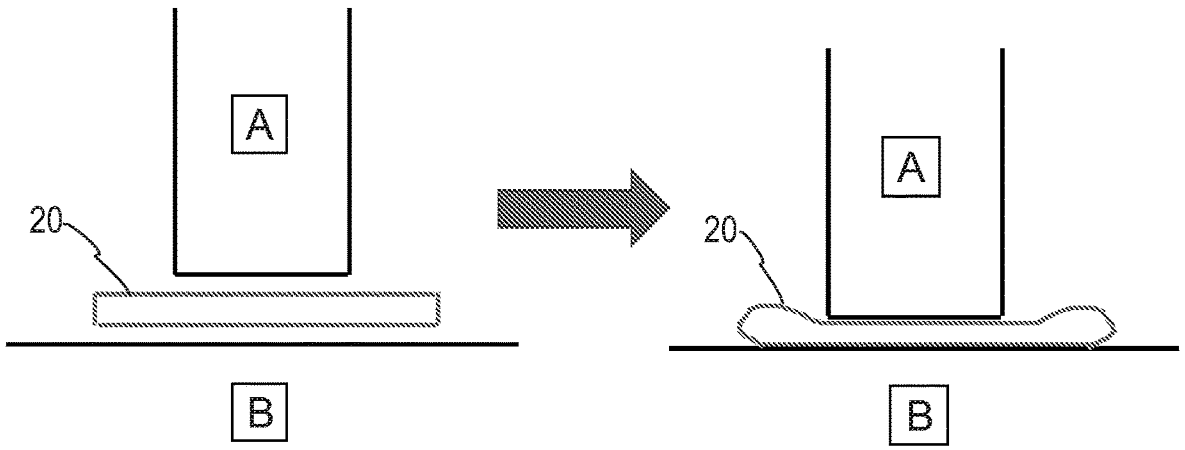
FIG. 10A and FIG. 10B are cross-sectional diagrams of two detector elements (“A” and “B”) with a deformable mass used to occlude or partially occlude the space therebetween.

FIG. 10A shows two detector elements ("A" and "B") having a space therebetween within which a deformable mass (20) is disposed. FIG. 10B shows the arrangement of FIG. 10A after downward movement of the element "A" such that the deformable mass occludes or partially occludes the space between element "A" and element "B". A soft mass is placed between two elements. The mass may need to be held in place, or is thicker than the nominal gap between the two elements and is held in place by pressure contacts with the two elements.

A detector may comprise a combination of any of the approaches using a deformable member or mass as disclosed herein.

In some situations, two detector elements may form an interface and also define a space therebetween. In such a case, approaches disclosed herein for inhibiting or preventing the flow of gas through both the interface and the space may be utilised in a detector.

The present detector may be used in any application deemed suitable by the skilled person. A typical application will be as an ion detector in a mass spectrometer. Reference is made to FIG. 1 which shows a typical arrangement of a gas chromatography instrument coupled to a mass spectrometer. Sample is injected and mixed with a carrier gas which propels the sample through the separation medium with the oven. The separated components of the sample exit the terminus of the transfer line and into the mass spectrometer. The components are ionized and accelerated through the ion trap mass analyser. Ions exiting the mass analyser enter the detector, with the signal for each ion being amplified by a discrete dynode electron multiplier therein (not shown). The amplified signals are process with a connected computer.

Applicant has been the first to recognize that carrier gas and other materials exiting with the sample components from the terminus of the transfer line may enter and contaminate the interior of the detector. This has acute negative effects (transiently altering the performance of the detector) but also more chronic negative effects which leads to long term performance deficient and a decrease in detector service life. Having discovered the true nature of the problem, Applicant provides a detector having one or more features which inhibit or prevent the entry of a contaminant via any discontinuity in a detector element, or any interface between two detector elements.

Given the discovery by the Applicant of the advantages of uncoupling the internal detector environment from the external detector environment, it is proposed that developments in detector construction will include the provision of more complete enclosures and housings so as to protect the electron emissive surfaces or a collector/anode surface from contaminants inherently present in vacuum chamber. Thus, various housing or enclosure elements may be added to prior art detectors and in that regard interfaces between elements may be created.

In addition to the configuration of detector element interfaces as described above, further structural features may be incorporated into a detector. As a first feature, the external surface of the detector enclosure may consist of as few continuous pieces (elements) as possible. Preferably, the enclosure is fabricated from a single piece of material so as to provide a continuous external surface, and in that case any discontinuities may be sealed with a sealant. This feature may be incorporated into the detector alone, or in combination with any one or more of any other feature of disclosed herein.

The size of any engineered discontinuity in the detector enclosure may be dimensioned so as to be as small (in terms of area) as possible. As used in this context, the term "engineered discontinuity" is intended to include any means by which a gas may migrate from external to internal the detector, such as any aperture, grating, grill, vent, opening or slot that is deliberately engineered into the detector. Such discontinuities will typically have a function (such as the admission of an ion stream into the detector), and accordingly may be dimensioned to be just large enough to perform the required function, but preferably no larger. In some embodiments, the engineered discontinuity may be larger than the absolute minimum required for proper functioning but may not be more than 1%, 2%, 3%, 4%, 5%, 6%, 7%, 8%, 9%, 10%, 11%, 12%, 13%, 14%, 15%, 16%, 17%, 18%, 19% or 20% larger than the absolute minimum required size. This feature may be incorporated into the detector alone, or in combination with any one or more of any other feature of disclosed herein.

Any engineered discontinuity in the detector enclosure may be oriented or aligned or otherwise spatially arranged to face away from any gas flowing in the external environment of the detector, such as a flow of residual carrier gas present in the mass spectrometer. This feature may be incorporated into the detector alone, or in combination with any one or more of any other feature of disclosed herein.

The external surface of the detector enclosure may use rounded features to create laminar flows and/or vortices from any gas flowing about the environment external to the detector. These laminar flows and/or vortices may provide high gas pressure regions that effectively seal a discontinuity which would other admit residual carrier gas. This feature may be incorporated into the detector alone, or in combination with any one or more of any other feature of disclosed herein.

Any discontinuity in the detector enclosure surface may have an associated gas flow barrier to inhibit the entry of a residual carrier gas. In some embodiment, the gas flow barrier is a detector element part of which may form an interface with another detector element. As will be appreciated, while a gas flow barrier may provide advantage, such a barrier may provide also a further portal for the entry of gas into the detector where the barrier forms an interface with another element of the detector. Given the benefit of the present specification, the skilled person is enabled to conceive of a range of contrivances that would be suitable for that function.

In some embodiments, the barrier has first and second openings, with one of the openings in gaseous communication with a discontinuity in the detector enclosure (and therefore the environment interior the detector) and the second opening in gaseous communication with environment exterior the detector. The second opening may be distal to the detector so as to be substantially clear of any flow of gas (such as a residual carrier gas). Any one or more of these features may be incorporated into the detector alone, or in combination with any one or more of any other feature of disclosed herein.

In some embodiments, the second opening is still exposed to a flow of gas, however the barrier is configured to prevent or inhibit the entry of the flowing gas to the interior environment of the detector. This end may be achieved by inhibiting or preventing the flow of gas that has entered the barrier, such that less or no gas that has entered flows to the environment internal the detector. For example, a gas flow barrier may be as long as possible, and/or as narrow as possible, and/or comprise one or more bends or corners; and/or comprise one or more 90 degree bends, and/or comprises internal baffling to minimise internal lines-of-sight. Any one or more of these features may be incorporated into the detector alone, or in combination with any one or more of any other feature of disclosed herein.

A gas flow barrier may be configured or positioned or orientated such that any opening faces away from a gas flows in the environment external the detector such as a flow of residual carrier gas used by a mass spectrometer. This feature may be incorporated into the detector alone, or in combination with any one or more of any other feature of disclosed herein.

A gas flow barrier may comprise rounded exterior surfaces so as to prevent or inhibit any electric discharge. Such rounded surfaces may, in addition or alternatively, create laminar gas flows and/or vortices from a gas flowing in the environment external the detector. These laminar flows and/or vortices may provide high pressure regions that essentially seal off an opening of the shield. This feature may be incorporated into the detector alone, or in combination with any one or more of any other feature of disclosed herein.

Two or more gas flow barriers may be configured or positioned or orientated so as to work together additively or synergistically so as to prevent or inhibit the entry of a gas flowing external the detector into the internal environment of the detector. This feature may be incorporated into the detector alone, or in combination with any one or more of any other feature of disclosed herein.

As a further feature the detector may comprise internal baffling to limit or completely remove any or all internal lines-of-sight through the detector. This feature is generally applicable so long as the optics of particles (such as ions and electrons) are not negatively impacted. This feature may be incorporated into the detector alone, or in combination with any one or more of any other feature of disclosed herein.

A detector will typically comprise an input aperture to admit a particle beam. Applicant has found that such aperture will typically admit significant amounts of residual carrier gas and associated material and in effect couples the detector interior and exterior environments. As discussed elsewhere herein such coupling is undesirable in many circumstances, and accordingly to the extent possible the size of the input aperture should be minimised This feature may be incorporated into the detector alone, or in combination with any one or more of any other feature of disclosed herein.

Where a detector comprises two apertures, it is preferred that the apertures are arranged such that there is no total or partial direct line-of-sight between the apertures. Such arrangement acts to interfere with the free flow of gas through the detector, this in turn preventing or inhibit entry of the residual carrier gas into the detector. This feature may be incorporated into the detector alone, or in combination with any one or more of any other feature of disclosed herein.

Where a detector is associated with an off-axis input optic apparatus, such apparatus may incorporate a discontinuity (such as a vent, a grill, an opening or an aperture) to facilitate any gas to flowing through the apparatus, rather than accumulate. This approach prevents or inhibits a localised build-up of gas about the input optics and in a region exterior the detector, with such gas having the propensity to enter the environment interior the detector. This feature may be incorporated into the detector alone, or in combination with any one or more of any other feature of disclosed herein. This feature may be incorporated into the detector alone, or in combination with any one or more of any other feature of disclosed herein.

Many embodiments of the present invention achieve advantage by controlling the vacuum conductance of a detector, which in turn controls coupling of the internal and external detector environments.

Where conductance is decreased in accordance with the present invention, the level of decrease may be expressed as a percentage of the conductance measured in the absence of a conductance-modulating feature of the present invention. The decrease in conductance may be greater than about 10%, 15%, 20%, 25%, 30%, 35%, 40%, 45%, 50%, 55%, 60%, 65%, 70%, 75%, 80%, 85%, 90%, 100%, 200%, 300%, 400%, 500%, 600%, 700%, 800%, 900% or 1000%.

The skilled artisan understands the concept of vacuum conductance, and is enabled to measure conductance of a detector, or at least the relative conductance of two detectors. As an approximation, a detector may be considered as a straight cylindrical pipe or a tube, the conductance of which may be is calculated by reference to the (overall) length (M) and radius (cm) of the pipe. The length is divided by the radius, which provides the L/a ratio, with the conductance (in L/sec, for example) being read off a reference table. The geometry of a detector may be somewhat different to a straight cylindrical pipe or a tube and so the absolute conductance calculated may not accurate. However, for the purposes of assessing the effectiveness of a conductance-modulating feature of a detector, such approximations will be useful.

In reducing the detector vacuum conductance so as to minimise the coupling of the internal and external environments general improvement in detector internal environment may result. Without wishing to be limited by theory in any way, this approach may allow for the electron flux of an electron multiplier of a detector to act as a pump, thereby creating a cleaner environment for detector operation. This cleaner internal environment primarily extends the service life of the multiplier. The secondary benefits, depending on how the detector is operated, also include reduced noise, greater sensitivity, increased dynamic range and reduced ion feedback. Reduction in the detector's vacuum conductance limits the impact of a detrimental external environment on detector performance and life. This includes both sustained and acute effects.

A further advantage is in the minimisation the negative effects of detector operation on detector performance and life. Applicant has found that a user's choice of duty cycle, ion input current and mode has an effect on detector performance and to a large extent on detector longevity. Such effects arise due to the vacuum relaxation time, which is the time taken for a substantially perfect vacuum to form inside a detector to equalise with the external environment. Relaxation time is typically consistent with the 'off time' in a duty cycle.

Similarly, it has been demonstrated that the discretised nature of electric charge leads to pseudo off times at typical ion input currents. These pseudo off times can be of the order of the detector vacuum relaxation time at sufficiently low currents, especially when a detector is operated in a time-of-flight (TOF) mode. In TOF mode the analyte ions are collected together in time. The number of different analytes, and their mass distribution, therefore also determines the pseudo off times in TOF mode. By minimising a detector's vacuum conductance, the vacuum relaxation time of the detector is extended. This allows the detector to achieve its intended performance and life over a greater range of duty cycles and ion input currents. Extension of the vacuum relation time also limits the effect of detector operating mode and mixture of analyte ions on detector performance and life.

A further effect of reducing vacuum conductance is to minimise changes in detector calibration due to changes in the external detector environment. This includes both sudden losses in gain due to acute arrival of contaminants, as well as temporary gain recovery due to water molecules reaching the detector surfaces.

The present invention may be embodied in many forms, and having one or a combination of features which cause or assist in a decrease of vacuum conductance of a detector. The invention may be embodied in the form of: a sealed detector, a partially sealed detector; a detector with one or more gas flow barriers; a detector associated with appropriately designed off-axis input optics that shunts any gas flows present away from the detector; a detector comprising one or more gas flow barriers in association with appropriately designed off-axis input optics that shunts any gas flows present away from the detector; a detector comprising an engineered discontinuity such as a vent, a grill, an opening and/or an apertures to prevent a localised build-up of gas in a detector with a line-of-sight input aperture; a detector comprising one or more gas flow barriers that further comprise an engineered discontinuity such as a vent, a grill, an opening and/or an aperture to prevent a localised build-up of gas in a detector with a line-of-sight input aperture; a detector using adjustable (and preferably movable) gas flow barriers to minimise conductance during operation.

In one embodiment, the detector is a discrete dynode electron multiplier of the type known to the skilled person. Such a multiplier may or may not comprise a conversion dynode in addition to a chain of amplifying dynodes.

A further embodiment is a microchannel plate (MCP) detector made up of 4 or more distinct elements in a stack to minimise vacuum conductance. Currently, up to 3 elements are necessary just to achieve required detector gains and to further minimise MCP vacuum conductance at least 4 elements are used with each additional element adding another bend in the path.

An MCP detector may use an enclosed collector to minimise vacuum conductance; an MCP detector rotating elements in a stack to minimise vacuum conductance. The MCP may comprise 'multichannel pinch point' (MPP) elements to minimise vacuum conductance. A MPP is a thin element, sitting between two conventional amplifying elements in a MCP stack, constituting many localised narrowings. There may be more than one narrowing for each channel in the amplifying elements that bracket the MPP. In this case the pinch points in the MPP are clustered together to line up with the amplifying elements channels.

An MCP detector comprising 4 or more distinct elements, with rotations, including multichannel pinch points and comprising an enclosed collector.

Another embodiment is in the form of a continuous electron multiplier (CEM) comprising one or more 'pinch points' to minimise vacuum conductance. A pinch point is defined as a localised narrowing of the CEM structure. When multiple pinch points are used they may be arranged serially/sequentially, in parallel or using a combination of both.

Another embodiment is a CEM comprising one or more bends to minimise vacuum conductance; or comprising an enclosed collector to minimise vacuum conductance; or comprising one or more twists about the detector axis to minimise vacuum conductance; or comprising a combination of pinch points, bends, twists and an enclosed collector.

While the present invention has been described primarily by reference to a detector of the type used in a mass spectrometer, it is to be appreciated that the invention is not so limited. In other applications the particle to be detected may not be an ion, and may be a neutral atom, a neutral molecule, or an electron. In any event, a detector surface is still provided upon which the particles impact.

It will be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details.

In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. Functionality may be added or deleted from the diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

The invention claimed is:

1. An ion detector for use in a mass spectrometer, the ion detector comprising:

an electron multiplier configured to receive an ion from an ion source and comprising one or more electron emissive surfaces, the electron multiplier comprising first and second housing elements configured to define on one side an environment internal to the electron multiplier and on the other side an environment external to the electron multiplier, wherein the first housing element and the second housing element form a non-linear or tortuous path between the environment external to the electron multiplier to the environment internal to the electron multiplier so as to inhibit or prevent a non-conventional flow of a gas from the environment external to the electron multiplier to the environment internal to the electron multiplier.

2. The ion detector of claim 1, wherein a sealant is disposed within or about the non-linear or tortuous path.

3. The ion detector of claim 1, wherein the first and second housing elements are positioned or angled relative to each other so as to form the non-linear or tortuous path.

4. The ion detector of claim 1, wherein the first and second housing elements are shaped so as to form the non-linear or tortuous path.

5. The ion detector of claim 1, wherein the non-linear or tortuous path is at a macroscopic level.

6. The ion detector of claim 1, wherein the non-linear or tortuous path comprises two or more linear sub-paths, wherein an angle is formed at the intersection of each of the two or more linear sub-paths.

7. The ion detector of claim 1, wherein the non-linear or tortuous path is curved, or comprises a curve, or comprises a series of curves.

8. The ion detector of claim 1, wherein the first housing element comprises a first formation or recess, and the second housing element comprises a second formation or recess, and wherein the first formation or recess snugly fits the second formation or recess so as to provide the non-linear or tortuous path.

9. The ion detector of claim 8, wherein the first housing element comprises multiple formations and/or recesses, and the second housing element comprises multiple formations and/or recesses, and wherein the formations and/or recesses of the first housing element snugly fit the second formations and/or recesses of the second housing element so as to provide the non-linear or tortuous path.

10. The ion detector of claim 1, comprising about 2, 3, 4, 5, 6, 7, 8, 9, 10, 15, 20, 25, 30, 35, 40, 45 or 50 interfaces formed between the first and second housing elements, the interfaces being configured to inhibit or prevent the non-conventional flow of a gas from the environment external to the electron multiplier to the environment internal to the electron multiplier.

11. The ion detector of claim 1 comprising: a deformable member disposed within or about the non-linear or tortuous path.

12. The ion detector of claim 11, wherein the deformable member is configured to inhibit or prevent entry of the non-conventional flow of a gas external to the electron multiplier into the electron multiplier.

13. The ion detector of claim 1, wherein when the ion detector is in operation within the vacuum chamber of a mass spectrometer, and wherein the inhibition or prevention of the non-conventional flow of a gas from the environment external to the electron multiplier to the environment internal to the electron multiplier is sufficient so as to cause the environment about an electron emissive surface or a collector/anode surface of the electron multiplier to be different to the environment immediately external to the electron multiplier with regard to: the presence, absence or partial pressure of a gas species in the respective environments; and/or the presence, absence or concentration of a contaminant species in the respective environments.

14. The ion detector of claim 9, wherein the non-linear or tortuous path is configured so as to decrease a vacuum conductance of the detector.

* * * * *